UNITED STATES PATENT OFFICE.

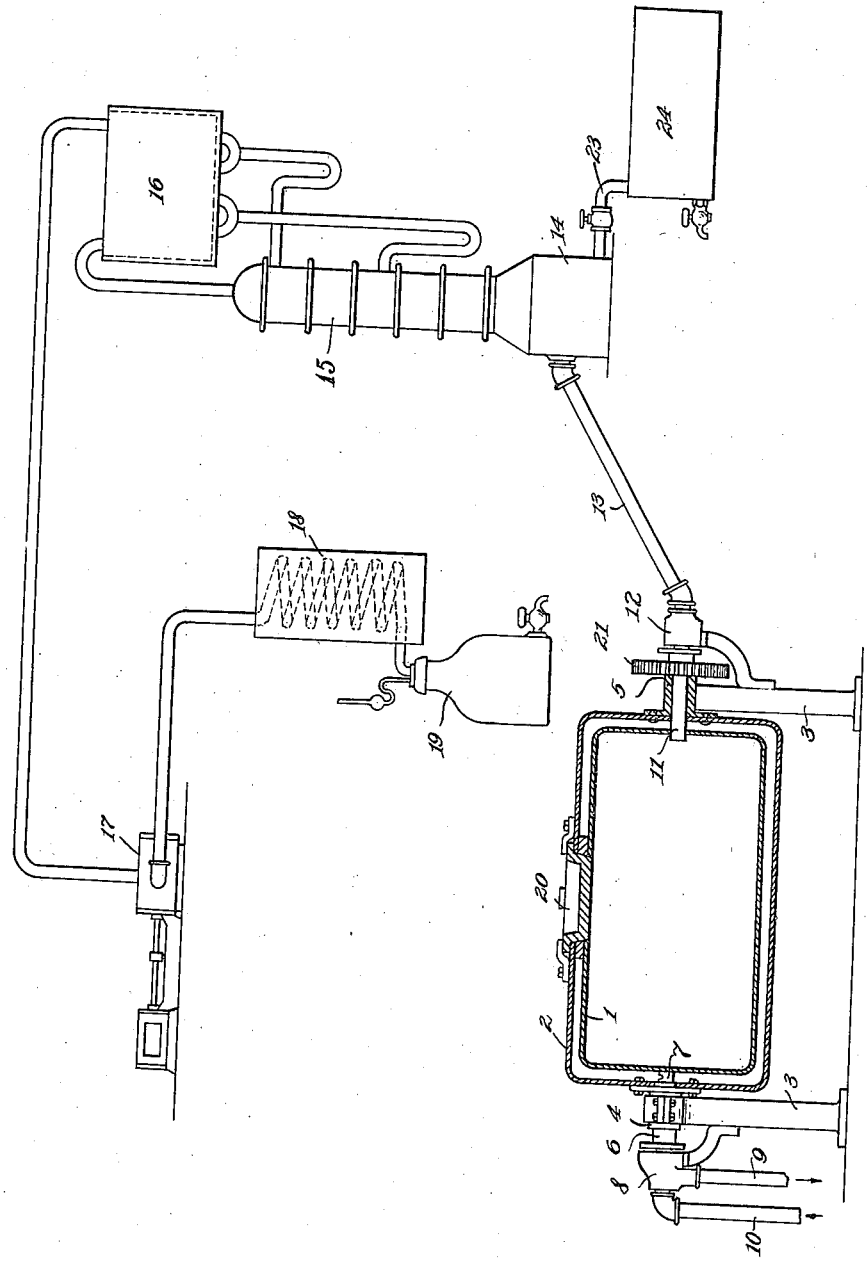

HERBERT H. DOW, OF MIDLAND, MICHIGAN, AND WILLIAM O. QUAYLE, OF WILMINGTON, DELAWARE, ASSIGNORS TO THE DOW CHEMICAL COMPANY, OF MIDLAND, MICHIGAN, A CORPORATION OF MICHIGAN.

METHOD OF MANUFACTURING CHLOROFORM.

1,311,329.　　　　　Specification of Letters Patent.　　Patented July 29, 1919.

Application filed June 3, 1914. Serial No. 843,605.

*To all whom it may concern:*

Be it known that HERBERT H. DOW, a citizen of the United States, residing at Midland, in the county of Midland and State of Michigan, and WILLIAM O. QUAYLE, a citizen of the United States, residing at Wilmington, in the county of New Castle and State of Delaware, have invented a certain new and useful Improvement in Methods of Manufacturing Chloroform, of which the following is a full, clear, and exact description, reference being had to the accompanying drawing.

This invention relates to the manufacture of chloroform and has for its particular object an improvement upon the process of making chloroform described in Letters Patent granted to Albert W. Smith of Cleveland, Ohio, on March 1, 1904, Patent No. 753,325. That process involved the separate production of carbon bisulfid and sulfur dichlorid, the interaction of these substances to produce carbon tetrachlorid, and finally the reduction of the carbon tetrachlorid to chloroform. The last of these reactions, which is the one with which this application is concerned, was effected by agitation of the liquid with finely divided metallic iron in a suitable container or reaction vessel, suitable expedients being provided whereby the temperature of the mass could be controlled. The principal reaction taking place was that indicated by the following formula:

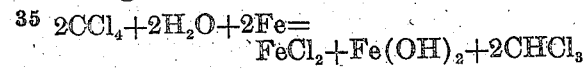

The temperature during this reaction must, however, be carefully controlled, since, if allowed to rise, the chloroform is also reduced according to the following reaction:

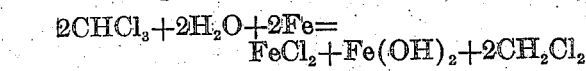

and at such higher temperatures, other decomposition products of carbon tetrachlorid are formed in greater proportions.

For this reason, Dr. Smith in the aforesaid Letters Patent suggested adding the iron in successive small portions, so that no large excess of iron should be present at any time, and also carrying on the reduction in a double walled vessel provided with means for circulating water or other cooling fluid between the two portions of the shell, a temperature of about 15° C. being employed.

Experience has shown that if the temperature of the container and contents be maintained at any point below, say, 20° C., a very satisfactory yield is obtained, with only a very small loss in the form of dichlormethane. However at this low temperature the reduction is so extremely slow as hardly to be a commercially feasible process; if the temperature is increased so as to quicken the action a lower yield is obtained owing to the overreduction of a larger percentage of the charge. Also, as the proportion of chloroform in the container was increased the opportunity for over-reduction became multiplied, thus rendering it impracticable to continue the operation longer than necessary to reduce about fifty per cent. of the tetrachlorid. When this point was reached the temperature would be raised and the chloroform together with the unreduced tetrachlorid removed from the iron and hydrated ferric oxid by distillation. However this distillation occupied considerable time and necessitated temperatures considerably above those of most efficient reactions, so that during this process of distillation both the chloroform and the tetrachlorid underwent serious destructive reduction which not only decreased the yield of chloroform but mixed that chloroform with undesirable destruction products which had to be freed therefrom by a slow and expensive process of separation.

Our experiments have shown that if the vapor pressure within the reaction vessel be reduced to that at which the mixture of carbon tetrachlorid and chloroform resulting from the reaction will boil, and the vapors so produced, (consisting chiefly of carbon tetrachlorid and chloroform together with some water), be fractionally condensed and the carbon tetrachlorid and water be returned to the reacting mixture, important advantages may be realized. Working in this manner, the percentage of chloroform in the reacting mixture is kept at a minimum, being removed therefrom substantially as fast as formed. The reduction is therefore confined chiefly to the predominating carbon tetrachlorid and very little overreduction takes place, hence a better yield is obtained. Also it is possible to employ higher temperatures and hence increase the rapidity of the reaction owing to the fact that the chloroform is removed so soon after formation as to minimize its opportunity for further reduction. Moreover, under reduced pressure as above described, the process may be continued until substantially all of the charge of tetrachlorid has been reduced, necessitating less of it in process and, in addition, producing a chloroform which is more nearly free from undesirable products and can be more cheaply purified and finished. Further, the reaction vessel is more constantly producing chloroform and that under uniform conditions, insuring best yield and purity of product. Finally, it is possible to add all the iron or other reducing agent required for the operation at one time, such amount in the case of iron, being always in excess of the theoretical requirement owing to the difficulty of obtaining complete oxidation.

In the drawings accompanying and forming a part of this specification we have illustrated one form of apparatus with which our improved process may be carried out, although it will be understood that the same is only one of many forms which could be employed within the scope of our invention. Describing the parts by reference characters, 1 represents the reaction vessel which preferably consists of a substantially cylindrical metal drum having an outer wall 2 spaced therefrom at all points to form a fluid jacket, the whole being rotatably journaled in suitable standards 3—3 by means of trunnions 4 and 5. The trunnion 4 is provided with a pair of concentric pipes 6 and 7, respectively, communicating with this fluid jacket, these pipes being connected by means of the swivel joint 8 with waste and supply pipes 9 and 10. The trunnion 5 is provided with the central pipe 11 communicating with the interior of the receptacle 1 and connected by means of the swivel joint 12 with an inclined conduit 13, the opposite end of which is attached to the lowermost chamber 14 of a fractionating column 15. Connected to the opposite side of this fractionating column through the dephlegmator 16 is a suitable vacuum pump 17, the exhaust from the pump passing into the final condenser 18, which in turn discharges into the receiver 19. The side of the reaction vessel is preferably provided with a removable cover 20 whereby the ingredients (carbon tetrachlorid, iron, and water) may be added, and the sludge remaining after the completion of the reduction may be withdrawn. One of the trunnions, as 5, may also be provided with a gear wheel 21 or the like, whereby the cylinder is rotated and its contents thoroughly mixed.

In the performance of our improved process the receptacle 1 is charged with a mixture of carbon tetrachlorid, iron filings, borings, or dust and water, the cover 20 is clamped securely in position, and a slow rotation of the receptacle commenced by means of the gear 21. At the same time the pump 17 is operated to reduce the pressure within the apparatus so as to reduce the boiling point of the mixture to the temperature at which it is desired to conduct the process, regard being had to percentage yield and time of reaction.

The pump is preferably arranged to maintain not only the reaction vessel but also the fractionating column, and the dephlegmator 16 under a reduced pressure or partial vacuum. The pump discharges into the final condenser 18, which drains into the storage receptacle 19. The chloroform and carbon tetrachlorid, being of considerably the same chemical composition and not differing very greatly in volatility, pass into vapor together, and the pressure within the reacting vessel is preferably so chosen that ebullition of the entire contents takes place with considerable freedom under the conditions of temperature maintained for the purpose. The vapors produced by this ebullition therefore consist of a mixture of chloroform and carbon tetrachlorid, together with some water, but these possess different condensing points, the carbon tetrachlorid condensing more easily than the chloroform and therefore being dropped in the fractionating column and returned to the receptacle by way of the conduit 13. The surviving chloroform vapor is further cooled in the refrigerator 16 and is completely precipitated in the final condenser 18 under a pressure approximately that of the atmosphere.

By removing the successive increments of chloroform from further contact with the reducing reagent soon after formation of the same, this process makes it practicable to work the reaction at a somewhat higher temperature than at present practised, thereby increasing an output of the apparatus, and at the same time avoiding the losses which are involved by the method heretofore followed, due, to the holding of the chloroform in contact with the reducing reagent for a considerable time after its formation, especially at high temperatures. We have found by actual experience that a temperature of approximately 30° to 35° C. will cause an evolution of chloroform at a rate that makes it commercially feasible to manufacture this material, and that the purity of the product formed through this reaction is such as to make it the basis of a commercial process. Accordingly, the pressure within the apparatus being brought to the necessary point, the temperature within the reaction vessel is raised until the temperature of the mass reaches the boiling point determined by this pressure, whereupon ebullition of the whole mass will take place, the chloroform being volatilized substantially as rapidly as it is formed and passing directly to the fractionating column.

Owing to the close chemical similarity of the substances, their rather similar boiling points even under atmospheric pressure, and the fact that they are miscible together in all proportions, both chloroform and carbon tetrachlorid will be present in the vapors at all times, their relative amounts depending upon the composition of the boiling mixture. Toward the end of the run when, either by reason of the nearly complete oxidation of the iron or the nearly complete reduction of the carbon tetrachlorid, the output of the reaction vessel falls off, the temperature may be raised (or the temperature and pressure both, since there is no longer any danger of overreduction) and the carbon tetrachlorid remaining in the reaction vessel distilled off through the column 15 and caught separately by withdrawal through the pipe 23 into the vessel 24, after which the reaction vessel may be opened and the remaining waste product, consisting of a water solution of ferrous chlorid mixed with ferric oxid and usually some unoxidized iron, may be dumped out and the vessel recharged for another run.

It will be understood that we do not limit ourselves to any specific temperatures or pressures, except that the pressures used shall be less than atmospheric. While we have suggested temperatures of 30° to 35° C. herein, this is merely an indication of what we consider preferable and is not a limitation. It will also be understood that the present drawings are largely diagrammatic, that the fractionating column, refrigerators, pumps, reservoir, etc., are shown in conventionalized form, that a great many changes in the construction of these elements and of their mode of connection and arrangement can be employed without departing from the scope of our invention. Thus instead of the single conduit 13 for attending to the outflow of the chloroform and the return flow of the carbon tetrachlorid it is obvious that other arrangements of pipes could be employed; also instead of connecting the pump at the particular point shown, the same could be connected in other parts of the system.

While we have described our invention in detail we do not therefore propose to be limited to such details except as the same may be positively included in the claims hereto annexed or may be rendered necessary by the prior state of the art.

Having thus described our invention, what we claim is:—

1. The process of making chloroform which contains the steps of mixing carbon tetrachlorid and water with a reducing agent sufficient in quantity to effect substantially complete reaction, reducing the pressure and concurrently elevating the temperature in the reaction vessel to such a point that distillation will proceed concurrently with the reaction, and separating the chloroform from the vapors so produced.

2. In a method of making chloroform, in which carbon tetrachlorid, water and a metal are caused to react, the steps which consist in maintaining the temperature of the reacting mixture at approximately 30° C., reducing the pressure over the reacting mixture to a point at which distillation will proceed concurrently with the reaction, recovering separately the unreduced carbon tetrachlorid and chloroform from the vapors so produced, and returning the unreduced carbon tetrachlorid so recovered to the reacting mixture.

3. In a method of making chloroform, in which carbon tetrachlorid, water and a reducing agent are caused to react, the steps which consist in reducing the pressure over the reacting mixture and elevating the temperature of the same to a point at which distillation and reduction will proceed concurrently at the desired speed, recovering separately the unreduced carbon tetrachlorid and chloroform from the vapors so produced and returning the unreduced carbon tetrachlorid so recovered to the reacting mixture.

4. The method of manufacturing chloroform which consists in agitating water, carbon tetrachlorid, and finely divided metallic iron together in a suitable receptacle, maintaining the temperature of the receptacle and its contents at a point between about 30° and 35° C., maintaining the pressure within the receptacle at such a point that free ebullition of its contents will take place at such temperature, and condensing the chloroform separately from the vapors produced.

5. The method of manufacturing chloroform, which consists in agitating together, water, carbon tetrachlorid, and finely divided metallic iron in a closed receptacle, such iron being in an amount in excess of that required for the actual reaction, maintaining the temperature of the receptacle and its contents between about 30° and 35° C., maintaining the pressure within the receptacle at a point where free ebullition of said contents takes place at such temperature, and separating the chloroform from the vapors of such ebullition.

6. The process of making chloroform which consists in reacting on carbon tetrachlorid with water and finely divided metallic iron in a reaction vessel mantained under reduced pressure, withdrawing coincidentally with the progress of the reaction, the vapors formed over the reacting mixture, fractionating such vapors under reduced pressure, returning the condensed and separated carbon tetrachlorid to the reaction vessel, and finally condensing and diverting into a separate vessel the chloroform in the surviving vapors whereby the chloroform produced and volatilized is removed from further contact with the reducing agent.

7. In a method of making chloroform in which metallic iron is caused to react upon carbon tetrachlorid in the presence of water, the steps which consist in maintaining the temperature of the reacting mixture substantially between about 30° and 35° C., maintaining the vapor pressure at such point that distillation will occur at that temperature, and separating the chloroform from the vapors evolved.

8. The method of manufacturing chloroform which consists in reducing carbon tetrachlorid by means of finely divided metallic iron in the presence of water, in a closed vessel at a temperature which will cause the production of commercially pure chloroform, and under a pressure which shall cause chloroform to boil at that particular temperature, and subjecting the vapors to fractional condensation whereby the chloroform is separated and recovered from the unreduced carbon tetrachlorid.

9. In a method of making chloroform in which metallic iron is caused to react upon carbon tetrachlorid in the presence of water, the steps which consist in maintaining the temperature of the reacting mixture substantially between 30° C. and 35° C., maintaining the vapor pressure in the reacting vessel at such point that distillation will proceed concurrently with the reaction, recovering separately the unreduced carbon tetrachlorid and chloroform from the vapors so produced, and returning the condensed carbon tetrachlorid to the reacting mixture.

10. In a method of making chloroform in which metallic iron is caused to react upon carbon tetrachlorid in the presence of water, the steps which consist in maintaining the temperature of the reacting mixture substantially between 30° C. and 35° C., maintaining the vapor pressure in the reacting vessel substantially at the boiling point of chloroform for the temperature employed, removing the evolved vapors from the reacting vessels substantially as rapidly as formed, condensing them separately, and returning the condensed carbon tetrachlorid to the reacting mixture.

11. In the method of making chloroform in which a reducing agent is caused to react upon carbon tetrachlorid in the presence of water, the regulating step which consists in maintaining the vapor pressure within the reaction vessel at that point which corresponds to the boiling point of chloroform at the reaction temperature desired.

In testimony whereof, we hereunto affix our signatures in the presence of two witnesses.

HERBERT H. DOW.
WILLIAM O. QUAYLE.

Witnesses to signature of Herbert H. Dow:
    THOS. GRISWOLD, Jr.,
    M. F. ANDERSON.

Witnesses to signature of William O. Quayle:
    P. E. STRICKLAND,
    R. H. RAWLEIGH.